Dec. 13, 1960

J. P. WATSON 2,964,602

SNAP ACTING MECHANISM

Filed April 2, 1956

JAMES P. WATSON
INVENTOR.

HUEBNER, BEEHLER, WORREL & HERZIG
ATTORNEYS

By Warren T. Jessup

Dec. 13, 1960

J. P. WATSON

2,964,602

SNAP ACTING MECHANISM

Filed April 2, 1956

JAMES P. WATSON
INVENTOR.

HUEBNER, BEEHLER, WORREL&HERZIG
ATTORNEYS

By Warren T. Jessup

Dec. 13, 1960

J. P. WATSON 2,964,602

SNAP ACTING MECHANISM

Filed April 2, 1956

JAMES P. WATSON
INVENTOR.

HUEBNER, BEEHLER, WORREL & HERZIG
ATTORNEYS

By Warren T. Jessup

Dec. 13, 1960　　　　J. P. WATSON　　　2,964,602
SNAP ACTING MECHANISM
Filed April 2, 1956　　　　　　　　　　7 Sheets-Sheet 4

JAMES P. WATSON
INVENTOR.

HUEBNER, BEEHLER, WORREL & HERZIG
ATTORNEYS
By Warren T. Jessup

Dec. 13, 1960 J. P. WATSON 2,964,602
SNAP ACTING MECHANISM
Filed April 2, 1956 7 Sheets-Sheet 6

JAMES P. WATSON
INVENTOR.

HUEBNER, BEEHLER, WORREL & HERZIG
ATTORNEYS
By Warren T. Jessup

Dec. 13, 1960  J. P. WATSON  2,964,602
SNAP ACTING MECHANISM
Filed April 2, 1956  7 Sheets-Sheet 7

JAMES P. WATSON
INVENTOR.
HUEBNER, BEEHLER, WORREL & HERZIG
ATTORNEYS
By Warren T. Jessup United States Patent Office 2,964,602
Patented Dec. 13, 1960

2,964,602

SNAP ACTING MECHANISM

James P. Watson, Whittier, Calif. (59 Waterway Road, Waterway Village, Jupiter, Fla.), assignor of one-half to Joe Davidson, South Gate, Calif.

Filed Apr. 2, 1956, Ser. No. 575,467

13 Claims. (Cl. 200—67)

This invention relates primarily to snap acting mechanisms, and more particularly to a snap acting leaf-spring-type electric switch.

It is an object of this invention to provide a snap acting mechanism having a very long operating life.

It is another object to provide a snap acting switch in which a circuit is broken simultaneously at two places.

It is another object of this invention to provide such a mechanism of simple structure having a minimum number of separate parts.

It is another object of this invention to provide a snap acting mechanism and particularly a snap acting switch wherein contact pressure between the contacts of the switch is very high in proportion to the force and power required to operate the switch from one position to another.

It is another object of this invention to provide a snap acting mechanism in which contact pressure is actually increased during the opening operation until the instant that contact separation occurs.

It is another object of this invention to provide a snap acting mechanism, and particularly a snap acting switch having compact size and low weight compared to its current-breaking capacity.

It is another object of this invention to provide a snap acting mechanism which may be effectively operated by shaft rotation with minimum complexity between the rotating shaft and the snapping action of the switch.

In modern engineering the importance of small or miniature switches is growing rapidly. Such switches, although themselves small, are generally complicated by the fact that the operating means or mechanism for the switch is so cumbersome as to vitiate largely the miniaturization of the switch itself.

It is an object of this invention to provide an integrated switch and operating mechanism which together will be small in weight and bulk and simple in operation.

It is another object to provide a switch and operating mechanism as above which is uniquely adapted for the operation of the switch by rotary motion, as through a shaft.

It is a further object of this invention to provide a snap acting switch of the leaf spring type employing an unbroken metal leaf, with consequent minimization of local stresses and resultant long life.

It is another object of this invention to provide a switch and operating assembly as above wherein a number of such assemblies may be ganged together for operation from a single shaft.

It is another object of this invention to provide a cam actuating mechanism in which the cam may be readily adjusted on its operating shaft without the necessity of opening the housing or casing of the mechanism.

It is another object of this invention to provide a cam mechanism including a shaft which may be moved either rotationally or axially to cause a cam to operate upon a cam follower.

It is another object of this invention to provide a mechanism as above wherein the cams on the shaft may be readily interchanged to introduce a different cam follower action pattern.

It is a further object of this invention to provide an assembly of snap actuating switches of compact bulk and weight which may be operated from a single shaft.

It is another object of this invention to provide means for prolonging the contact life of a switch mechanism, thereby making the mechanism capable of standing many millions of circuit openings and resultant arc formations.

It is another object of this invention to provide a cam mechanism including a rotary cam and cam follower of such design that the cam follower attains a predetermined operating position at a given shaft position irrespective of the direction of rotation of the cam actuating shaft.

It is another object of this invention to provide a leaf-spring snap acting mechanism the operation of which is virtually independent of ambient temperature change.

It is another object of this invention to provide improved and simplified means for installing an electric terminal within a switch housing.

In accordance with these and other objects which will become apparent hereinafter, preferred forms of the present invention will now be described in connection with the accompanying drawings wherein.

Figure 1:
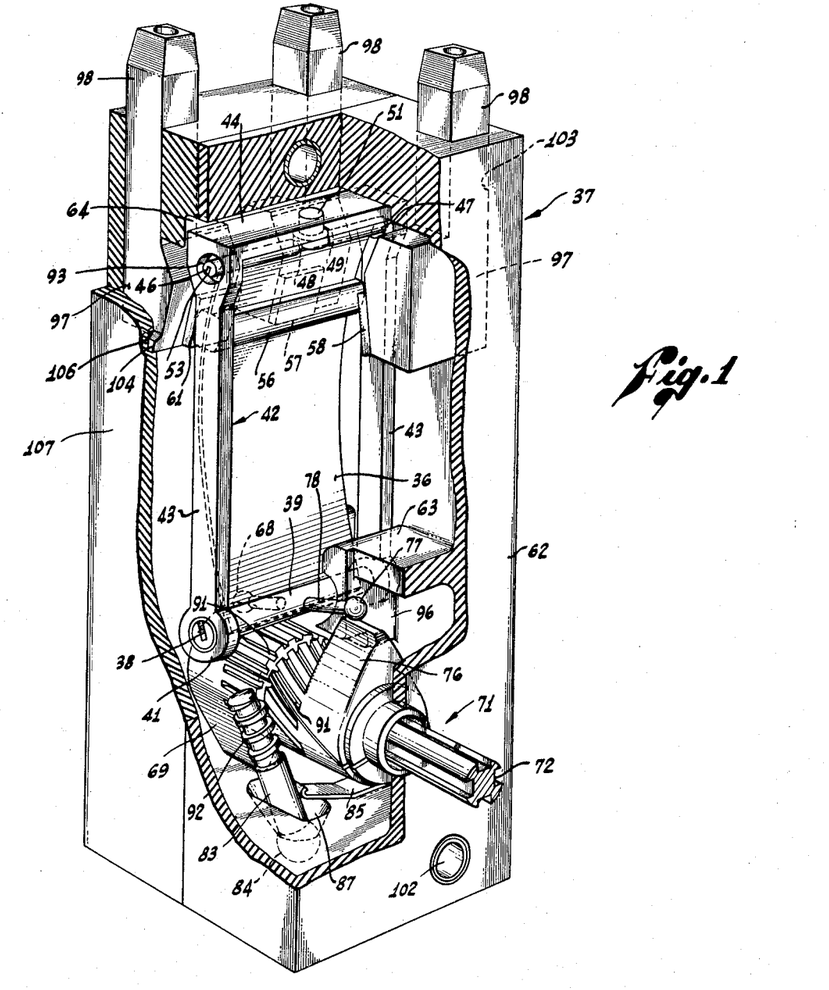
Fig. 1 is a perspective view partially broken away illustrating one form of switch constructed in accordance with the present invention.
Figure 2:
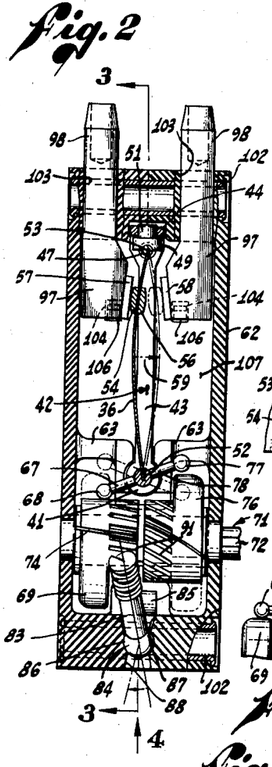
Fig. 2 is a longitudinal section of the switch shown in Fig. 1.
Figures 2A, 2B, 3, 4:
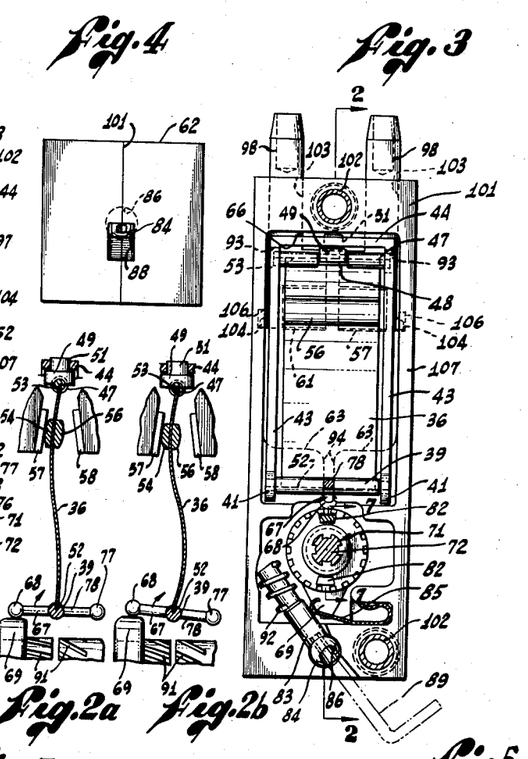
Figs. 2a and 2b are fragmentary views generally similar to Fig. 2 showing successive steps in the switch operation.
Fig. 3 is a view taken on line 3—3 in Fig. 2, illustrating one half of the switch separated at the parting line between the two sections of the switch housing.
Fig. 4 is a bottom plan view of the switch viewed as indicated by arrow 4 in Fig. 2.

Referring to the drawings and initially to Figs. 1, 2, and 3, the snap acting mechanism of the present invention is shown in the form of an electric switch. The switch comprises a leaf spring means in the form of a rectangular, unbroken leaf or sheet 36 of stiff, springy material such as beryllium copper. The leaf 36 is pivotally journaled at each end in a support means shown generally at 37. The lower journal axis 38 consists of a pivot shaft 39 journaled at each end in hubs 41 formed at the respective ends of an open-ended frame 42. The frame 42 consists of a pair of parallel arms 43 which are spanned at their upper ends by an integrally formed cross piece or arm 44.

The upper journal axis 46 comprises a shaft 47 relieved at 48 to form a journal portion journaled in a semi-circular cavity in a bearing member 49. Opposite the bearing cavity in the member 49 is a transverse pivot pin 51 which is in turn journaled in the cross piece 44 of the frame 42. The lower end of the leaf 36 resides in a longitudinal slot 52 in the shaft 39 and the upper end of the leaf 36 resides in a slot 53 in the shaft 47. The straight line distance between the ends of the leaf 36 when thus mounted in the shafts 39 and 47, respectively, is less than the actual length of the leaf 36 itself, thereby forcing the leaf to assume a bowed or arched attitude, as shown in Fig. 2.

Near the upper end of the leaf 36, that is the end mounted in the shaft 47, the leaf 36 has secured thereagainst an operating means in the form of an electric contact 54, which moves back and forth (Fig. 2) as the leaf 36 is snapped from one side to the other by a means to be described hereinafter. A similar contact 56 is provided on the opposite side of the leaf 36, as shown in Fig. 2. The contacts 54 and 56 extend laterally across the full width of the leaf 36 as shown in Fig. 3.

In the position shown in Fig. 2, the operating means or contact 54 bears forcefully against an operated means, in this instance being an abutment means in the form of a stationary contact 57 fixedly mounted with respect to the support means 37. The positioning of the contact 57 is such that when the leaf is arched to the left as shown in Fig. 2, the contact 54 bears firmly and forcefully against the stationary contact 57 to maintain good electrical contact. A similar stationary contact 58 is positioned on the opposite side of the leaf 36 and is engaged by the contact 56 when the leaf 36 is snapped to the other side of a line joining the axis 38 and 46, as shown by the arrowed line 59.

The contact 57 is one of a pair of contacts 57 and 61 (Fig. 3) which are bridged by the movable contact 54 carried by the leaf 36 when the leaf is snapped into the position shown in Fig. 2. Similarly, the contact 58 is one of a pair (the other not being shown) which are bridged by the movable contact 56 whenever the leaf 36 is snapped to the right, in Fig. 2. The four contacts thus described are secured to and in electrical conducting relation with four electrically isolated terminals that emerge from the top of the support means 37 and which will be described more in detail hereinafter.

The frame 42 forms but a part of the support means 37, being itself mounted and contained within a housing 62. The housing 62 is generally and for the most part hollow but is provided with certain inwardly extending parts or ledges to provide suitable mounting, support and guidance for various parts contained therewithin. Four ledges 63 are extended inwardly in the housing 62 to provide mounting for the hubs 41 in which the shaft 39 is journaled. In similar fashion, the upper portion of the housing 62 is extended inwardly, as shown at 64 to loosely accommodate the frame 42.

This mounting is such as to permit of appreciable longitudinal movement between the frame 42 and housing 62 as shown by the space 66. This is to provide for relative temperature expansion and contraction between the frame 42 and housing 62, which is the principal reason for the provision of the frame 42. In order to retain consistency of operation under all operating temperatures, the mounting in which the leaf 36 is placed should expand and contract exactly as the leaf does in order to maintain the same stress in the arch of the leaf. By provision of the frame 42, the same or substantially the same material may be used in the frame 42 as in the leaf 36, thereby achieving this desideratum. This permits the housing 62 to be made of a material preferably non-conducting, which is more suitable for the other function which the housing 62 must fulfill. In fact, the frame 42 may be designed not only to compensate for dimensional temperature changes of the leaf 36, but if desired, may be made of a material having a smaller temperature coefficient of expansion than the leaf 36 so as to actually increase the compression or stress in the leaf with increasing temperature. Since increasing temperature tends to decrease the spring rate of most metals, this feature may be utilized to vary the compressive stress so as to maintain a substantially constant spring action for the leaf 36.

In accordance with the present invention, the leaf 36 is caused to snap from one position to another in Fig. 2 by pivoting or rotating the shaft 39, to which the lower end of the leaf 36 is securely mounted. As shown in Fig. 2a, rotation of the shaft 39 clockwise creates a wave or node which travels progressively up the leaf 36. Just before the contact 54 separates from the stationary contact 57 the wave has created a double bend or arch in the leaf 36 (Fig. 2b) which produces an even greater contact pressure, between 54 and 57, than the already considerable force existing in the position shown in Fig. 2. When the leaf 36 does snap over, it snaps with high acceleration and with high velocity and when the movable contact 56 on the leaf 36 engages the stationary contact 58 the arch in the leaf 36 has already been reversed and a steady force is exerted to hold the contacts 56 and 58 together, thereby virtually eliminating troublesome contact bounce occurring in most abutment type contacts. The maintenance (and actual increase) of high pressure between the contacts 54 and 57 until the instant of separation thereof minimizes the duration of the arc which occurs when the circuit is broken between the contacts 57 and 61 by virtue of the departure of the bridging movable contact 54.

The means for pivoting or rotating the shaft 39 comprises an arm 67 secured to the shaft 39 and extending transversely thereof. At the end of the arm 67 is a ball 68 which is engaged by a rotating cam 69 mounted to be rotated by a shaft means 71.

Figures 6, 7, 7A:
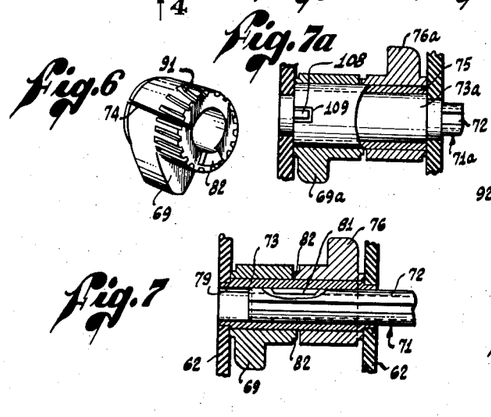
Fig. 6 is a perspective view of one of the cams forming a portion of the switch operating mechanism.
Fig. 7 is a fragmentary cross section taken on line 7—7 in Fig. 3.
Fig. 7a is a section similar to Fig. 7 illustrating a modification of this portion of the mechanism.

The cam actuating mechanism for the shaft 39 is shown in cross section in Fig. 7. As shown therein, the shaft means 71 consists of a center shaft which is splined to the interior of a sleeve 73. The cam 69 is frictionally mounted over the sleeve 73 so as to be adjustable thereon, but to be relatively fixed with respect thereto during normal operation of the switch.

The cam 69 is made of somewhat resilient material and is split as shown at 74 so that it may be forced over the sleeve 73 and retained in tight frictional engagement therewith through the resiliency of the cam material.

The cam 69 is one of a pair of cams 69 and 76, the cam 76 also being frictionally mounted on the sleeve 73 axially adjacent the cam 69, as shown in Fig. 7. The cam 76 acts upon a ball 77 formed on the end of another operating arm 78 projecting from the shaft 39 opposite to and in alignment with the arm 67. The cam 69 thus serves to pivot the shaft 39 in a clockwise direction to snap the leaf 36 to the right, and the cam 76 serves to pivot the shaft 39 in a counter-clockwise direction to snap the leaf 36 to the left. By the use of the two arms 67 and 78 with their respective operating cams, no biasing spring is necessary and the leaf 36 remains firm in one position or the other until it is positively driven out of that position by cam action.

The sleeve 73 extends from one wall of the housing 62 to the other wall as shown in Fig. 7 and the axial bore extends clear through the sleeve 73 to permit the shaft 72 to pass completely through the housing 62 if desired. In this way, several housings may be placed side by side with the respective sleeves 73 in alignment and may all be driven from a single shaft 72 passing through or into each of the sleeves 73. To improve tolerance when this type of ganging is employed, the splines or keys 81 extending inwardly in the bore 79 of the sleeve 73 occupy only the center portion of the sleeve 73 as shown in Fig. 7, so that the spline connection between the shaft 72 and the sleeve 73 is limited to the center of the sleeve. Thus by providing clearance between the shaft 72 and the bore 79, misalignment tolerance is made aavilable in the ganging of several switches together.

Since the leaf 36 is rocked back and forth by the two arms 67 and 78, it will be readily seen that if the two cams 69 and 76 were to be adjusted until they coincided angularly, the mechanism would jam, since there would be simultaneous pressure on the shaft 39 both clockwise and counterclockwise. In order to preclude such relative angular adjustment between the cams 69 and 76, inter-engaging stop means between the two cams are provided in the form of arcuate shoulders 82 formed on the respective adjacent faces of the two cams 69 and 76. These shoulders preclude such cam adjustment as would cause jamming in operation.

In use of the switch mechanism of this invention, it is often desirable to be able to adjust the particular point in rotation of the shaft means 71 at which the leaf snaps to the right and also the point at which it snaps to the left. It is for this purpose that the cams 69 and 76 are adjustably, although frictionally, secured to the sleeve 73. In order to rotationally adjust the cams 69 and 76 on the sleeve 73, without having to open the housing 62 in any way, a worm shaft 83 is provided having on one end a ball 84 which is mounted in a socket 86 formed in the bottom wall of the housing 62. The socket 86 communicates with the interior of the housing 62, as shown at 87, in order to allow the worm shaft 83 to project into the vicinity of the cams 69 and 76 and also communicates with the exterior of the housing 62 as shown at 88 in order to allow a wrench 89 to be engaged in a corresponding socket formed in the ball 84.

Each of the cams 69 and 76 is provided with a worm wheel having teeth 91 preferably formed integral with the cam, and the worm shaft 83 is likewise provided with threads 92 for engaging selectively the teeth 91 on the cams 69 or 76. The universal mounting of the worm shaft 83 in the socket 86 permits it to be engaged selectively with either the teeth 91 on the cam 69 or those on the cam 76, or alternatively to be disengaged from both of the worm wheels as shown in Fig. 3. The worm shaft 83 is normally biased completely out of engagement with either cam by a leaf spring 85.

Following insertion of a wrench 89, one may pivot the shaft 83 into position opposite the desired cam 69 or 76 and then pivot the threads 92 into engagement with the worm wheel teeth 91. While maintaining the worm shaft 83 in this position, rotation of the wrench 89 then causes rotation of the selected cam until the desired adjustment is achieved. Either cam may be thus adjusted independently at will.

Figure 5:
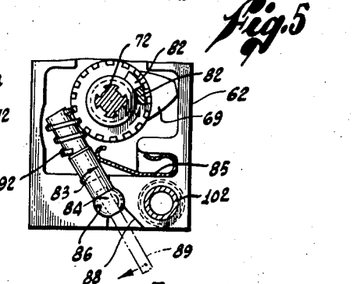
Fig. 5 is a view similar to Fig. 3 illustrating certain parts in a different position of operation.

The ball and socket mounting of the worm shaft 83 leaves the housing 62 essentially unbroken while still permitting ready external adjustment of either of the cams. The worm thread 92 is shown in engagement with the cam 69 in Fig. 5.

The purpose of the transverse pivot mounting 51 at the upper end of the leaf 36 is to allow the upper end of the leaf 36 to twist slightly, if necessary, to bring the bridging contact 54 into firm and uniform engagement with its respective stationary contacts 57 and 61. Thus, a seating of the movable contact 54 on its two stationary contacts is provided which would be impossible if the two ends of the shaft 47 were to be journalled in the frame 42 in the same manner as the shaft 39 is journalled in the frame.

The pivotal mounting 51 gives rise to a possible danger that in a transient period during the snapping over of the leaf 36, and since the travel path of the contacts 54 and 56 is very short, there is danger that there may be momentary diagonal bridging across contacts, that is for example stationary contact 58 might be momentarily bridged to stationary contact 61 by the dual action of the movable contacts 56 and 54, an operation not desired and which might be of serious consequences. To prevent such diagonal bridging while still retaining all of the twisting necessary to provide good seating, the ends of the shaft 47 are projected into openings 93 in the respective arms 43, these openings forming stop means limiting twisting of the upper end of leaf 36 about the pivot 51 and thereby precluding such diagonal bridging across the stationary contacts.

In order to permit oscillation of the arm 67, a slot 94 is formed between two opposite ledges 63 and a similar slot is formed for the arm 78. The ledges, including the slot 94 are projected downwardly as shown at 96 in Fig. 1 to provide for a bearing surface for the sides of arms 67 and 78, to absorb a side thrust imparted to the balls 68 and 77 by the cams 69 and 76. Thus, the side thrust of the cams is absorbed directly rather than in the journalling between the shaft 39 and the hubs 41.

In accordance with the present invention, several means are provided for prolonging switch life by extending contact life. One of the reasons for the deterioration of contact surfaces in switches is the fact that the heat generated by the arc which is formed whenever the switch is opened is not dissipated rapidly enough, and as a result the localized temperature of the switch contact becomes very high. This may be true even though other parts of the switch remain relatively cool. The problem then is one of immediate and rapid heat dissipation away from the local area of the arc. While this may be achieved by the use of terminals that are relatively large, and bulky, there is a serious disadvantage that large terminals projecting from the switch housing result in relatively small clearances between the terminals with consequent danger of short circuits as wires must be secured to the terminal. In accordance with the present invention, the terminals 97 to which the respective contacts 57, 58, 61, etc. are secured, are made with that portion of the terminal which is inside the housing and immediately adjacent the contacts relatively large. At the same time, only a relatively small or narrow elongate portion 98 projects through the wall of the housing 62 to become the external terminal to which the wires are connected. The mass of the terminal 97 within the housing is several times that of the mass 98 which is outside of the housing and the terminal is made of a material having a high specific heat, such as copper. The terminals thus constitute a relatively large heat sump for the temporary storage of high temperature heat generated by arcing at the relatively thin contacts 57 etc., which are preferably made of a precious metal having high heat conductivity such as silver. Since the arcing time is a relatively minor fraction of the total switching cycle, the heat generated by the arc at the contacts 57 etc., rapidly dissipates into the much larger mass of the terminal 97 without appreciably raising the temperature of the terminal 97. From the heat sump constituted by the terminal 97 the heat is continuously conducted through the external portion 98 to the ambient atmosphere.

The casing or housing 62, which is preferably formed of non-conducting material, is made in two sections, with the parting line normal to the shaft means 71 as shown at 101. The two sections of the housing 62 are held together by hollow rivets 102 which parallel the shaft means 71. In this way, a number of switches may be ganged together by passing mounting bolts, one through each of the rivets 102, and paralleling the shaft 72.

In accordance with the present invention, simple, yet sturdy means are provided for securing the terminal 97 within the housing 62. As shown in Figs. 1, 2, and 3, the external portions 98 of the terminals 97 pass through corresponding rectangular openings 103 formed in the top wall of the housing 62. The inner end of each terminal 97 is provided with a laterally projecting toe or boss 104 adapted to engage in a notch 106 formed in the side wall 107 of the housing 62, to create a notch and boss engagement between the terminal and the housing. The terminal 97 is pressed into the rectangular passage 103 from the inside, until the toe 104 snaps into position in the notch 106. In this way, the terminals are held firmly and securely in position without requiring any bonding substance.

A variant of the coupling between the shaft means 71 and the cams, for example the cam 69, is shown in Fig. 7a. In this variant, an outer sleeve 75 is fitted loosely over the sleeve 73a which is splined to the center shaft 72. Thus the outer sleeve 75 becomes, in effect, part of the operating shaft means 71a. The cams 69a and 76a are frictionally mounted over the outer sleeve 75. Outer sleeve 75 is coupled rotatively to sleeve 73a only by a radial tab 108 which extends into a recess or hole 109 in the sleeve 75. The tab and recess thus form a stop means limiting the free radial movement between outer sleeve 75 and sleeve 73a. There is thus introduced into a system a deliberate but predetermined backlash between the shaft 72 and the cams 69a and 76a. This backlash, when properly proportioned, has the effect of causing each cam for example the cam 69a to effect snapping of the leaf 36 from one position to the other at the same position of the shaft 72, irrespective of whether the cam 69a approaches the ball 68 in a clockwise or counter clockwise direction.

Basic operation of the snapping action of the present switch is illustrated in Figs. 2a and 2b, wherein Fig. 2a shows the shaft 39 partially rotated clockwise by the cam 69. A rotation is thus applied to the leaf 36 at the bottom end thereof. This rotation as shown in Fig. 2a creates a wave or node which travels up the leaf as shown in the successive views of Figs. 2a and 2b. This wave effects an increased lengthwise compression within the leaf 36, causing the contact 54 to press even more firmly into engagement with the stationary contacts 57—61. Thus, up until the actual departure or snapping away of the contact 54, the contact pressure at 54—57 is actually increased. When the leaf 36 finally snaps to the right, the contact pressure drops abruptly, as the contacts 54 and 56 move from left to right with high acceleration and high velocity. By thus maintaining an even increasing contact pressure chatter is eliminated.

Figure 8:
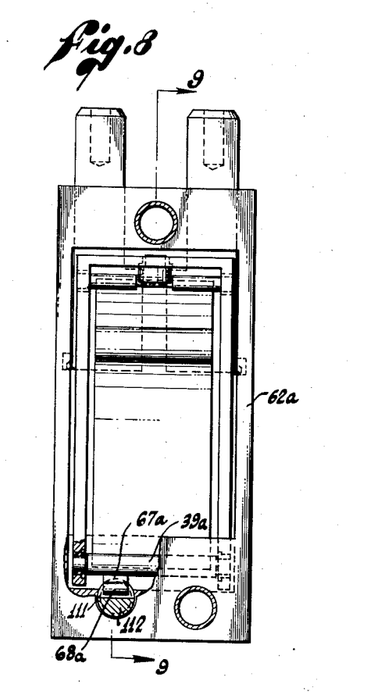
Fig. 8 is a view of another form of switch taken on line 8—8 in Fig. 9.
Figure 9:
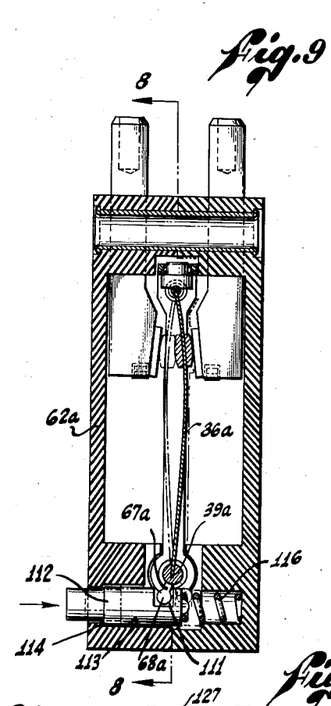
Fig. 9 is a cross section taken on line 9—9 in Fig. 8.

While the switch of the present invention is especially adapted for cam actuation from a rotating shaft, it is also well adapted for other types of actuation. One such type is illustrated in Figs. 8 and 9. In this form of the present invention, there is no shaft means 71, cams 69 or 76, and the lower pivot shaft 39a is provided with a single transverse arm 67a extending downwardly therefrom as shown in Fig. 9. At the end of the arm 67a is a ball 68a which rides in a notch 111 formed transversely in a push button member 112 mounted for reciprocation within the case or housing 62a substantially transverse of the pivot shaft 39a. The push button 112 reciprocates in a bore 113 and is prevented from coming completely out of the case 62a by interengaging shoulders between the button 112 and the bore 113, shown at 114. A compression spring 116 biases the push button 112 to its outward position such that the shaft 39a is maintained in its clockwise position and the leaf 36a is consequently maintained in its right hand position.

When the pushbutton 112 is operated by being pushed to the right in Fig. 9, the shaft 39a is rotated slightly or oscillated counterclockwise, thereby snapping the leaf 36a to the left, where it remains as long as the pushbutton is held in. When the button 112 is released, the spring 116 returns it to the left and the leaf 36a snaps back again to its right hand position.

One of the reasons for switch mortality is the fact that the arc formed when the contacts separate causes burning of the contacts, so that they soon fail to make good electrical connection when they come into contact with each other. Two, mutually independent means for prolonging contact life against this life-shortening arc action are shown in the embodiment of this invention illustrated in Figs. 10, 11, 12 and 13.

One of these means is shown in the form of a gas pumping means consisting of a compressible bellows 117, one wall 118 of which is substantially fixedly mounted with respect to the switch housing, and the other wall of which is mounted to the leaf 36b. Compressible and expandable between the two members 36b and 118 is the accordion-like bellows 117. At the upper end of the bellows 117 is a small pipe 119 which communicates with the interior of the bellows 117 and which leads air inhaled and exhaled by the bellows 117 around the side of the leaf 36b to a nozzle 121 which is directed across the face of the stationary contact 57b.

Figures 10, 12, 13:
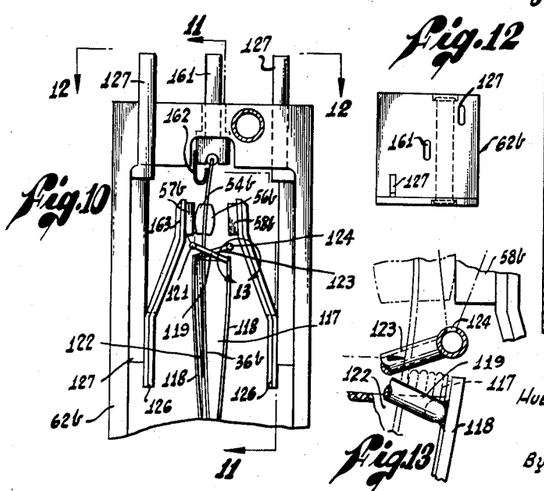
Fig. 10 is a fragmentary view illustrating another form of the present invention.
Fig. 12 is a top plan view taken on line 12—12 in Fig. 10.
Fig. 13 is a fragmentary enlarged elevation taken in the same direction as Fig. 10.
Figure 11:
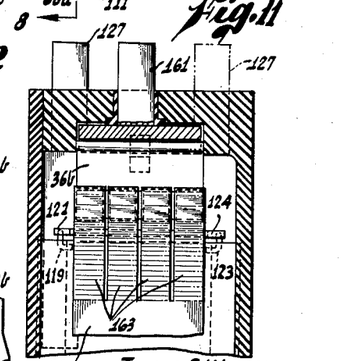
Fig. 11 is a fragmentary section taken on line 11—11 in Fig. 10.

In the position shown in Fig. 10, the bellows 117 is filled with air. When the leaf 36b snaps to the right, air is forced from the bellows 117 and out the nozzle 121, over the contact surface of the stationary contact 57b. This blast of air not only cools the contact surface, but also removes from the contact zone the products of the electric arc, namely the gases and the tiny solid products of the electric arc formed upon breaking of the circuit.

A similar bellows 122 is mounted on the opposite side of the leaf 36b and likewise has a pipe 123 and nozzle 124 to direct a blast of air across the opposite stationary contact 58b.

It will be seen that, in operation, the bellows 117 and 122 alternatively inhale and exhale whatever gas the interior of the housing 62b may be filled with, thereby directing a cooling stream of such gas across whichever pair of contacts is open circuiting.

The embodiment of the switch shown in Figs. 10–13 is of a different type than that shown in Fig. 1. The movable arm, in this case the leaf 36b, is a current carrying member and must be electrically connected to a center terminal 161. In order to avoid passing current down the length of the leaf, contact to the leaf is made at the upper end, and since it is undesirable, although possible, to transmit current through the bearing surface at the upper end of the leaf 36b, a flexible pigtail 162 is provided, bypassing this bearing surface and connecting the upper end of the leaf 36b and the center terminal 161.

In the embodiment shown, the stationary contact member, 57b for example, actually consists of a plurality, in this case four, parallel connected contacts mounted on the upper end of four fingers 163 formed at the upper end of a bi-metallic ply stationary contact member 126. The contact 126 is secured physically and electrically to the terminal 127 which extends upwardly out of the case 62b. The bi-metallic fingers 163 are somewhat resilient, so that when the contact 54b, which spans all of the fingers 163, bears against them, each finger gives slightly until the aggregate resistance of all of the fingers equals the pressure exerted by the leaf 36b through the contact 54b.

Each of the fingers 163 constitutes a thermally sensitive means for individually moving its respective contact away from the contact 54b in dependence upon increase in temperature in the particular finger 163. The fingers 163 thus share the current load in proportion to the pressure with which they bear against the contact 54b. The finger 163 taking the greatest load will, of course bear the most and the bi-metallic action will cause that finger to withdraw from the contact 54b thus lessening the current through that particular finger. In this way, a self-acting compensating effect is achieved whereby the current flow and hence the amount of arcing at each of the four contacts 57b is equalized. This has the salutary effect of providing substantially continuous contact over large areas without the necessity of precisely fitting the engaging contacts to one another; and of preventing any one contact from carrying an undue share of the load with consequent burning and pitting.

The adaptability of the present switch for actuation through a wide variety of operating means is illustrated by way of example in the switch modifications shown in Fig. 14, Figs. 15–17 and Figs. 18–19, respectively.

Figures 14, 15, 16, 17, 18, 19:
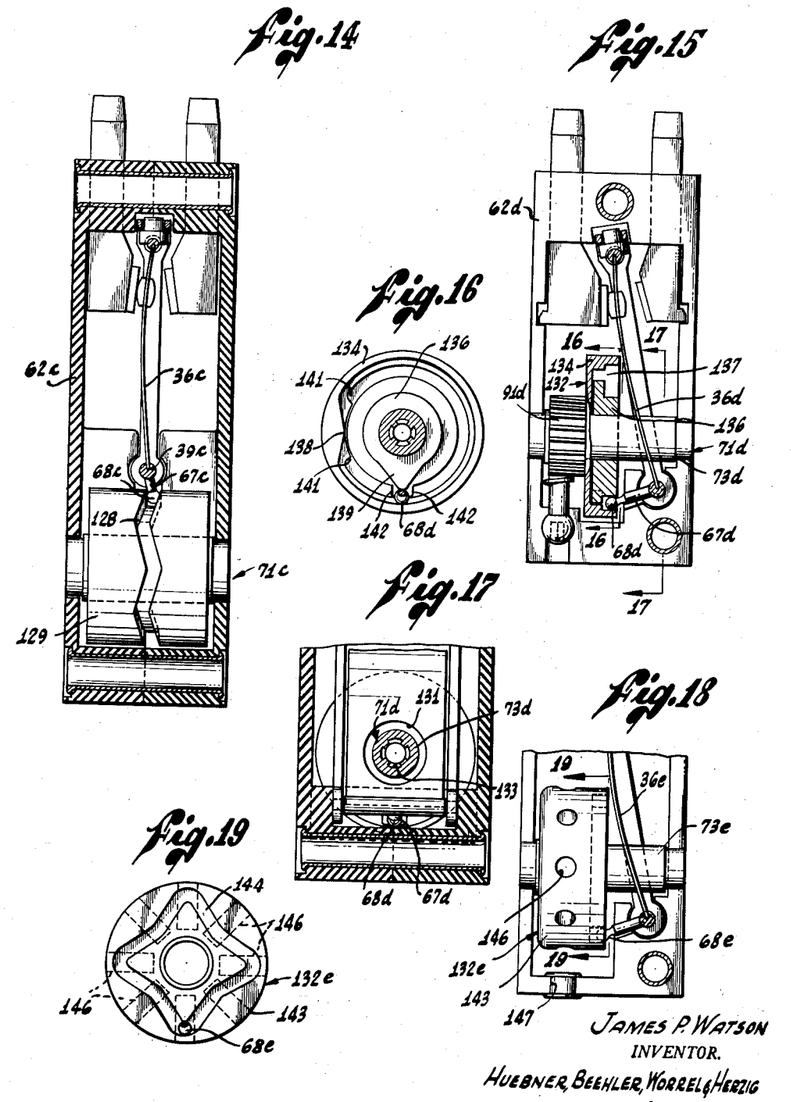
Fig. 14 is a longitudinal section of still another form of the present invention.
Fig. 15 is an elevation illustrating another form of the present invention.
Fig. 16 is a fragmentary cross section taken on line 16—16 in Fig. 15.
Fig. 17 is a fragmentary section taken on line 17—17 in Fig. 15.
Fig. 18 is a fragmentary view of a modification of the actuating cam shown in Fig. 15.
Fig. 19 is a section taken on line 19—19 in Fig. 18.

In Fig. 14, the shaft 39c is provided with a depending arm 67c, having a ball head 68c on the end thereof. The head 68c rides in a zig-zag endless groove 128 formed in the circumferential face of a cam 129. The cam 129 is mounted for rotation within the housing 62c in substantially the same way as the cams 69—76 of Fig. 1, or may alternatively be fixedly mounted to a shaft means 71c without any provision for frictional adjustment thereon. The ball 68c has a diameter slightly less than the width of the groove 128. As the cam 129 rotates, the ball 68c is moved back and forth by the action of the groove 128 to produce a corresponding snapping of the leaf 36c.

The modification shown in Figs. 15–17 also causes an arm to be actuated by the operation of an endless groove formed in a cam. In this case, however, the endless groove is formed in the end face of the cam rather than the circumferential face, and consists of an inner member and an outer member which may be adjusted relative to each other to produce an adjustable switching action.

This embodiment also illustrates how the total length of the switch may be measurably shortened by lifting the cam mechanism into a region directly beside the leaf 36d, skewing the leaf 36d in the case 62d to make room for the cam. In this embodiment leaf 36d has a hole 131 therein through which passes the shaft means 71d that operates the actuating cam means 132.

The shaft means 71d consists of an inner sleeve 73d journaled in the housing 62d and having an internally splined opening 133 through which an operating shaft may pass, such as the shaft 72 shown in the Fig. 1 embodiment.

Frictionally mounted over the sleeve 73d is an outer cam 134 having a hub on which worm wheel teeth 91d are formed. The teeth 91d may be engaged selectively by the thread of a worm shaft 83d in a manner similar to the embodiment illustrated in Fig. 1. Also mounted frictionally on the sleeve 73d is an inner cam 136 disposed within a recess 137 formed in the face of the cam 134.

The cam 134 is provided with a radially inward projecting cam lobe 138 adapted to engage and move upward the ball 68d formed on the end of the switch actuating arm 67d. When the ball 68d is thus moved upward the leaf 36d is snapped to the right where it remains until the ball 68d is moved downward by the action of an inner lobe 139 formed on the inner cam 136. Thus, the arm 67d is alternately forced up and down by the successive action of the two cam lobes 138 and 139.

As explained before, the outer cam is adjusted by means of the worm shaft 83d in a manner similar to that described hereinbefore in connection of Fig. 1. During adjustment the sleeve 73d is held fast by holding the shaft which passes through the sleeve.

The inner cam 136 is adjusted through movement of the outer cam 134. This is brought about by the provision of cooperating shoulders 141 on the outer cam 134 and 142 formed on the inner cam 136. In use, the inner cam 136 is adjusted first. This is done by rotating the outer cam 134 by means of the worm shaft 83d until one of the shoulders 141 comes into engagement with the opposite shoulder 142 formed on the inner cam 136. The inner cam 136 is then pushed ahead of the outer cam 134, both cams rotating frictionally on the sleeve 73d, until the desired position of the inner cam 136 is attained. The rotation of the worm shaft 83d is then reversed and the outer cam 134 is backed off until it occupies the desired position. In this way, both the inner lobe 139 and outer lobe 138 are adjusted to the desired positions in relation to the shaft means 71d, by use of a single adjustment means 83d. Hence, the point at which the leaf 36d snaps to the left and also the point at which it snaps to the right may be readily adjusted and controlled. The worm thread 92d is automatically disengaged from worm teeth 91d after adjustment by a spring (not shown) which is similar to spring 85 shown in Fig. 3.

A simplified form of cam means 132e is illustrated in Figs. 18 and 19. In this case, a single cam body 143 is provided, having an endless groove 144 formed in the face thereof in which the ball 68e rides. The groove 144 proceeds in a zig-zag fashion around the center of the cam so as to produce back and forth snapping of the leaf 36e.

The cam 143 is frictionally mounted on the sleeve 73e and is adjusted with respect thereto by means of radial capstan holes 146 into which a small capstan bar (not shown) may be inserted through an access hole 147. The access hole 147 is made sufficiently larger than the capstan bar to permit the necessary oscillation of the bar and consequent sufficient turning of the cam 143 so that successive holes 146 may be engaged.

Figure 20:
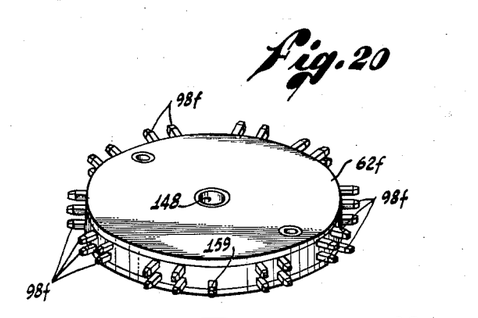
Fig. 20 is a perspective view illustrating a multi-switch form of the present invention.
Figure 21:
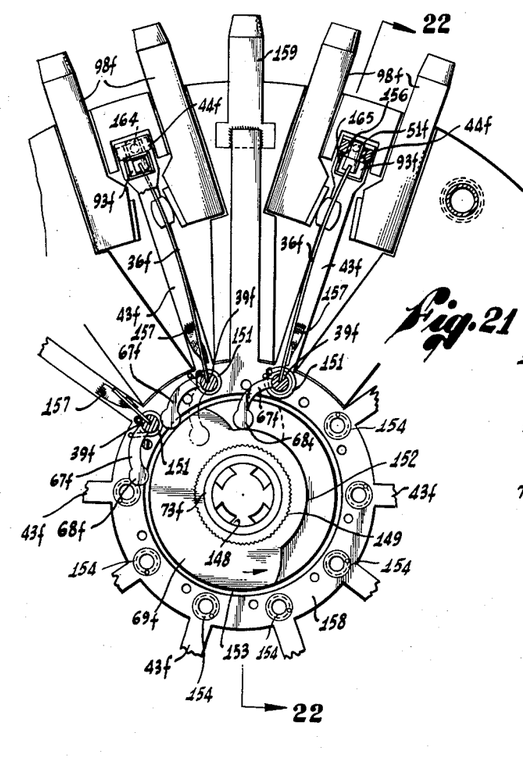
Fig. 21 is a fragmentary cross-section of the switch shown in Fig. 20.
Figure 22:
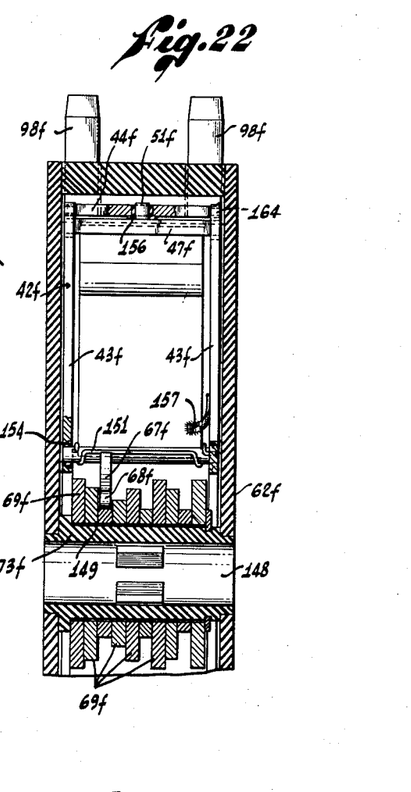
Fig. 22 is a sectional view taken on line 22—22 in Fig. 21.

In Figs. 20–22, the switch of the present invention has been shown adapted into a multi-contact switch consisting of a plurality of members all actuated from a single rotating shaft. As shown in Fig. 21, the several leaf members 36f are disposed radially, i.e., in spoke fashion, about a center opening 148 through which the operating shaft extends. As in the case of the switch shown in Fig. 1, each of the leaf members 36f has associated therewith four terminals 98f which project radially out of the circular housing 62f.

Each pivot shaft 39f is provided with a curved cam-follower arm 67f terminating in a ball 68f which rides against a preselected cam 69f. A plurality of cams 69f are provided disposed axially upon the sleeve 73f, each cam 69f serving to actuate one of the arms 67f. Each cam 69f is splined to the sleeve 73f as shown at 149 so that it may be removed from the sleeve 73f and readjusted thereon in any angular position desired.

The ball heads 68f are all biased radially inward by means of torsion springs 151 encircling the respective pivot shafts 39f and having their ends embedded in the respective frame arms 43f with the intermediate portions of the springs 151 bearing resiliently against the respective arms 67f to bias the ball heads 68f inwardly.

Each of the cams 69f is cut in any desired fashion, so that at any desired predetermined angular position, the corresponding arm 67f is forced outward with consequent snapping of the associated leaf 36f, and allowed to drop back under urging of the spring 151 wherever the cam 69f is relieved inward. Each cam 69f thus has a surface 152 of relatively small radius and a surface 153 of relatively large radius.

To isolate each leaf 36f electrically, each pivot shaft 39f is journaled in a pair of insulating grommets 154 in which are likewise secured to the projecting ends of each spring 151. The upper end of the leaf is also insulated by a suitable insulating grommet 156. If desired, these insulating points may be deliberately by-passed by respective flexible pigtail members 157 connected between each leaf 36f and its corresponding frame 42f.

To adapt the switch selectively for a wide variety of applications, the lower end of each of the frame arms 43f may be connected to or made integral with a common ring 158 from which extends radially a common terminal 159.

In this way, if desired, current may be selectively fed from a single input terminal 159 to any pair of associated terminals 98f in any desired pattern of operation, depending upon the shape and placement of the cams 69f. This use of the switch employs the several radial leaf spring members 36f as distributing arms.

Whenever it is desired that the switch leaves 36f be electrically isolated, it is only necessary to remove the pigtails 157, thus isolating the terminal 159 and allowing each of the switches to operate electrically independently in the same manner as the basic switch illustrated in Fig. 1 operates.

It will be clear that where the common terminal 159 is employed, and connected to each of the leaves 36f, the insulating grommets 154 and 156 may, if desired, be omitted.

The switch shown in Figs. 20–22 also illustrates an alternative manner of pivotally mounting the upper or outer end of the leaf members 36f. It will be recalled that in the Fig. 1 embodiment, the cross piece or cross arm 44 of the frame 42 was formed integral with the frame and the upper pivot shaft 47 was journalled in the lower end of the transverse pivot pin 51.

In the switch embodiment shown in Figs. 20–22, the pivot pin 51f is formed integral with the upper shaft 47f and is journaled in the cross piece 44f through the intermediacy of the insulating sleeve or grommet 156 alluded to hereinbefore. To permit the necessary slight pivoting of the shaft 47f the cross piece 44f is then journaled at each end 164 in the upper ends of the respective arms 43f.

As in the embodiment described in connection with Fig. 1, the shaft 47f projects into windows or openings 93f formed in the arms 43f, for the same purpose, namely to prevent excessive twisting of the upper end of the leaf 36f which might cause diagonal bridging of the stationary contacts 97f as described hereinbefore. For those uses of this switch where the leaf 36f must be electrically isolated, it is thus necessary to provide insulating bushings 165 at each side of the windows 93f to prevent electrical contact between the shaft 47f and the frame arms 43f.

In Figs. 23–26, there is illustrated a modification of the pancake or radial type switch illustrated in Fig. 20. In this form, the cam action is effected by a plurality of individual cam members 69g. Each cam is provided with a T-section base 166 adapted to slide into an undercut groove 167 of similar shape formed axially in the surface of a cylinder 168 forming the shaft means carrying the cams 69g. A plurality of such axial grooves 167 are formed in the cylinder 168, completely therearound, so that if and when each groove 167 is completely occupied with cams 69g, the entire surface of the cylinder 168 is overlaid with cams. In order to achieve the necessary back and forth movement of the cam follower arms 67g, spacers 169 are provided as alternates to the cams 69g. The spacers 169 are identical with the base portions 166 of the cams 69g. Thus wherever a spacer 169 is used the ball 68g of the cam follower drops down on the spacer 169, even with the surface of the cylinder 168. In this manner, any desired cam pattern may be placed on the surface of the cylinder 168 varying both circumferentially and axially.

The cylinder 168 has an axial bore 171 which fits slidably over an axial stud 172 projecting into the housing of the switch from the external wall 173. The cylinder 168 is thus mounted over the stud 172 for both axial and rotative movement.

Three circumferential rows of detents 174 are provided at the forward end of the cylinder 168 in which seats a spring pressed ball 176 mounted in the housing wall 177. By means of an external knob 178 the cylinder 168 may thus be rotated to bring the cams 69g rotatively into engagement with the various cam followers 68g. In the embodiment shown the cylinder 168 may also be pulled out in two steps, thereby bringing the cams 69g axially into engagement with the cam followers 68g. The switch is thus readily adapted for operation either by rotation or axial reciprocation of the cylinder 168. If desired, both methods of operation may be successively employed. Thus rotation of the knob 178 produces a given switching pattern depending on the placement of cams 69g and spacers 169. By pulling the knob 178 out one notch, a second pattern is effected. In similar fashion pulling the knob 178 out another notch effects a third rotary switch pattern.

When the knob 178 is pulled out one notch, the numeral 2 is visible on the cylinder 168 to show the operator that the knob is in the number 2 axial position; similarly further pulling out of the knob 178 reveals the numeral 3 to indicate that the switch is in the third axial position.

An indexing arrow 179 on the circumferential surface of the knob 178 cooperates with a plurality of numbered radial lines 181 imprinted on the wall 177 to indicate the rotational position of the switch.

The cams 69g and spacers 169 are held in place against radial and tangential movement by the natural mating configuration of the undercut slot and corresponding shape of the base or spacer member. They are held against axial movement by being stacked against each other, the entire stack being held in place by a recessed cap 182 held in place by three counter sunk flat head bolts 183 threaded into the end of the cylinder 168.

Figure 26:
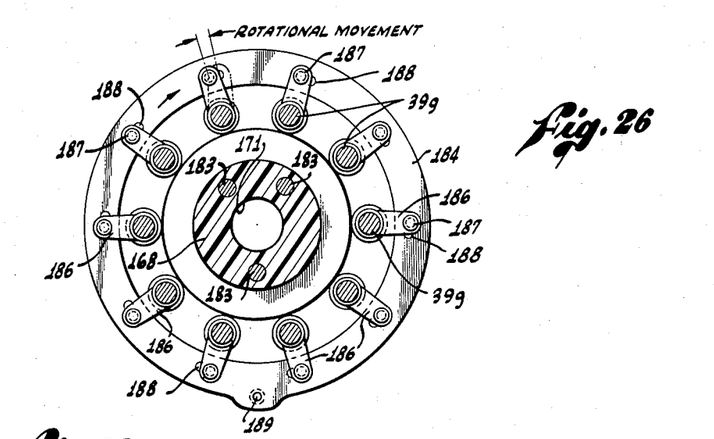
Fig. 26 is a cross section taken on line 26—26 in Fig. 24.

As in the modification shown in Fig. 20 et seq, the follower arms 67g are biased inwardly toward the cylinder 168 by individual torsion springs 151g. Means are provided for simplifying removal and replacement of the shaft means carrying the cams 69g i.e. the cylinder 168, as well as to permit movement of the shaft means to a given axial and rotative setting, without running through all of the intervening switch sequences. This is a means for lifting and holding all of the switch arms 67g away from the cams 69g, and consists of a ring 184 mounted circumjacent the several auxiliary or operating shafts 39g carrying the respective follower arms 67g. Each shaft 39g has a short arm 186 projecting radially therefrom. A pivot pin 187 links the outer end of each arm 186 through a slot 188 to the ring 184. As shown in Fig. 26, when the ring 184 is rotated clockwise each of the arms 186 is likewise pivoted slightly clockwise causing a corresponding pivoting of each shaft 39g with consequent pivoting of each arm 67g away from the cams 69g. The slots permit each shaft 39g, in normal operation, to pivot individually without affecting the others.

Rotation of the ring 184 is effected through a finger 189 threaded into the ring 184 and projecting through a radial slot 191 in the wall 177.

Figure 24:
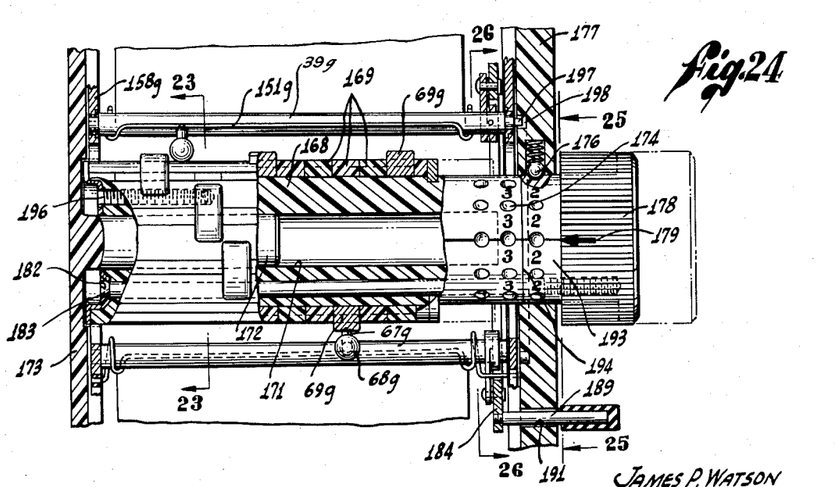
Fig. 24 is a cross section taken on line 24—24 in Fig. 23.
Figure 25:
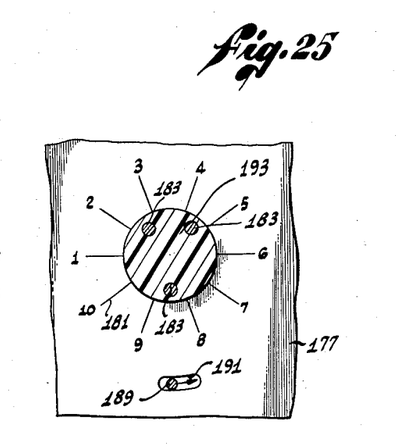
Fig. 25 is a cross section taken on line 25—25 in Fig. 24.

The switch of Fig. 24 is so constructed and designed that a number of such switches may be ganged together in alignment to be operated by a single operating knob 178. The manner in which this is accomplished will be explained by assuming that the switch shown in Fig. 24 is to have secured to the end thereof an identical switch whose parts or elements will be referred to by the same numerals as are contained in Fig. 24 but carrying a prime.

To adapt the switch of Fig. 24 for the ganging arrangement mentioned above, the forward end of the cylinder 168 is made of a separate part 193, to which the knob 178 is secured or made a part of. The parting line between the cylinder 168 proper and its front end 193 is shown at 194. The bores for the bolts 183 are made smooth in the cylinder 168 proper and are tapped only in the forward section 193. In this manner, bolts 183 serve the double function of holding the retaining cap 182 in place and also of securing the front end of the cylinder 193 to the cylinder proper 168.

Figure 23:
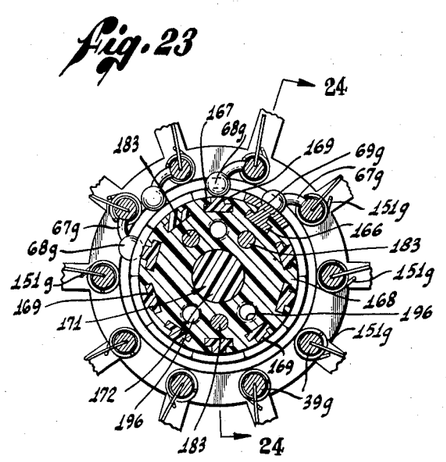
Fig. 23 is a cross section of a modified form of cam actuating mechanism for the switch shown basically in Fig. 20.

The first step in ganging two switches together is to remove the rear wall 173 which forms the outer case for the switch. This operation of course also removes the stud 172. As explained hereinbefore, the bolts 183 are spaced around the cylinder 168, but as shown in Fig. 23, this spacing is not symmetrical, thereby providing a unique keying relation between the cylinder 168 and the knob 178 carrying the index 179. Removal of the rear wall 173 exposes three additional bores 196 (Fig. 23) in the rear end of the cylinder 168, these bores being tapped in the same manner as the front cylinder portion 183. The flat heads of the bolts 193 are recessed in the cap 182, as shown in Fig. 24, and the rear face of the cylinder 168 is thus ready to receive flush thereagainst the front face of its homologue 168'.

Figure 27:
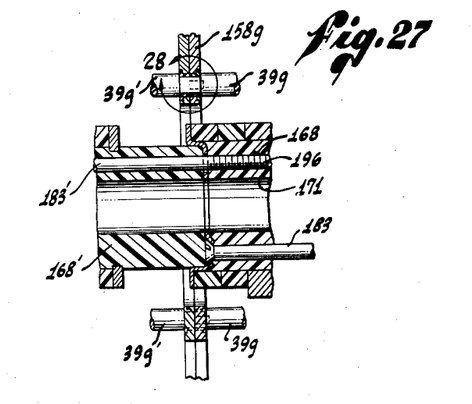
Fig. 27 is a fragmentary section taken generally in the same plane as Fig. 24, showing the manner in which two switches of the kind shown in Fig. 24 may be ganged together to be operated by a single shaft means.

The second switch is prepared for ganging to the first switch by unscrewing and removing the finger 189', unscrewing the three bolts 183' and removing the forward cylinder portion 193' and knob 178'. The front wall 177' is also removed. The cylinder 168' is thus ready to be ganged in alignment with the cylinder 168 by screwing the three bolts 183' into the tapped bores 196 formed in the end of the cylinder 168. The resultant connection appears as shown in the fragmentary view Fig. 27.

In order that the finger 189 of the front or first switch may still serve to lift all of the cam followers 67g of the ganged combination, means are provided to link the several switch operating shafts 39g together.

Figure 28:
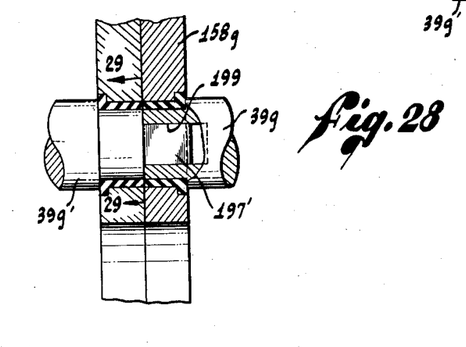
Fig. 28 is an enlarged view of that portion shown at 28 in Fig. 27.
Figure 29:
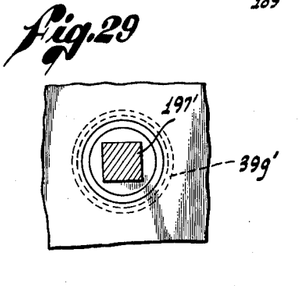
Fig. 29 is a cross section taken on line 29—29 in Fig. 28.

This means comprises squaring and extending the front end of each shaft 39g as shown at 197. In the front switch this squared end resides in a clearance bore 198 formed on the interior of the front wall 177. The rear end of each shaft 39g is provided with a square opening 199 (Fig. 28) which receives the squared extension 197' of the ganged switch as shown in Fig. 28.

In this manner, any number of switches identical with that shown in Fig. 24 may be ganged together.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims.

What is claimed is:

1. Snap acting mechanism comprising: support means, leaf spring means pivotally journalled in said support means on axes at each end of said leaf spring means and having a hole therethrough, said axes being spaced apart a distance less than the length of the leaf spring means between the axes, thereby compressing said leaf spring means from end to end and forcing said leaf spring means to assume an arched attitude, one of said axes comprising a first shaft pivotally mounted in said support means, the corresponding end of said leaf spring means being secured to said first shaft, an arm secured to said shaft and extending transversely thereof, a cam rotatably mounted with respect to said support means, and a second shaft passing through said hole in said leaf spring means for rotating said cam, thereby to actuate said arm and turn said first shaft to cause said leaf spring means to snap from one side of an imaginary line joining said axes to the other side thereof.

2. Snap acting mechanism comprising: housing means, frame means mounted in said housing means at least one end of said frame means being mounted for longitudinal expansion and contraction with respect to said housing means, leaf spring means pivotally journalled in said frame means on axes at each end of said leaf spring means and being compressed longitudinally to assume an arched attitude, one of said journal axes comprising a pivot shaft pivotally mounted in said frame means, the corresponding end of said leaf spring means being secured to said shaft, the other end of said leaf spring means being journalled with respect to said support means, both on an axis substantially paralleling said shaft and on an axis longitudinal of said leaf spring means, whereby said other end of said leaf spring means is free to twist slightly relative to said shaft, means for turning said shaft to cause said leaf spring means to snap from one side of a line joining said axes to the other side thereof, electric contact means carried by said leaf spring means on both sides thereof, and two pairs of stationary contact means mounted to said housing means, one pair on each side of said leaf spring means in position to be engaged by said electric contact means upon snapping of said leaf spring means, and stop means for limiting twisting of said leaf spring means about said transverse axis to preclude diagonal contact across said stationary contact means by excessive twisting of said leaf spring means.

3. Snap acting mechanism comprising: housing means, frame means mounted in said housing means, at least one end of said frame means being mounted for longitudinal expansion and contraction with respect to said housing means, leaf spring means pivotally journalled in said frame means on axes at each end of said leaf spring means and being compressed longitudinally to assume an arched attitude, one of said journal axes comprising a pivot shaft pivotally mounted in said frame means, the corresponding end of said leaf spring means being secured to said shaft, the other end of said leaf spring means being journalled in and free to turn with respect to said frame means, both on an axis substantially paralleling said shaft, and on an axis longitudinal of said leaf spring means, whereby said other end of said leaf spring means is free to twist slightly relative to said shaft, an operating shaft journalled in said housing means transversely of said leaf spring means and of said pivot shaft, a pair of cam means mounted to said operating shaft on opposite sides of said leaf spring means, a pair of cam follower arms secured to said pivot shaft and extending transversely therefrom on opposite sides thereof into the path of movement of said respective cam means, to be engaged by said respective cam means, thereby to pivot said pivot shaft back and forth to effect snapping of said leaf spring means, and inter-engaging stop means on the respective cam means to prevent such relative adjustment between said cam means as would result in jamming through simultaneous operation of both said cam means upon said cam follower arms.

4. Snap acting mechanism comprising: housing means, frame means mounted in said housing means, at least one end of said frame means being mounted for longitudinal expansion and contraction with respect to said housing means, leaf spring means pivotally journalled in said frame means on axes at each end of said leaf spring means and being compressed longitudinally to assume an arched attitude, one of said journal axes comprising a pivot shaft pivotally mounted in said frame means, the corresponding end of said leaf spring means being secured to said shaft, the other end of said leaf spring means being journalled in and free to turn with respect to said frame means, both on an axis substantially paralleling said shaft, and on an axis longitudinal of said leaf spring means, whereby said other end of said leaf spring means is free to twist slightly relative to said shaft, a sleeve journalled in said housing means transversely of said leaf spring means and of said pivot shaft, a pair of cam means mounted to said sleeve on opposite sides of said leaf spring means, a pair of cam follower arms secured to said pivot shaft and extending transversely therefrom on opposite sides thereof into the path of movement of said respective cam means, to be engaged by said respective cam means, thereby to pivot said pivot shaft back and forth to effect snapping of said leaf spring means, inter-engaging stop means on the respective cam means to prevent such relative adjustment between said cam means as would result in jamming through simultaneous operation of both said cam means on said cam follower arms, and a center shaft extending said shaft sleeve and splined thereto, the central opening of said sleeve passing completely through said housing means to permit said center shaft to extend completely through said housing means, whereby a plurality of similar switch mechanisms may be stacked together to be operated from a single center shaft.

5. Snap acting mechanism comprising: housing means, frame means mounted in said housing means, at least one end of said frame means being mounted for longitudinal expansion and contraction with respect to said housing means, leaf spring means pivotally journalled in said frame means on axes at each end of said leaf spring means and being compressed longitudinally to assume an arched attitude, one of said journal axes comprising a pivot shaft pivotally mounted in said frame means, the corresponding end of said leaf spring means being secured to said shaft, the other end of said leaf spring means being journalled in and free to turn with respect to said frame means, both on an axis substantially paralleling said shaft, and on an axis longitudinal of said leaf spring means, whereby said other end of said leaf spring means is free to twist slightly relative to said shaft, a sleeve journalled in said housing means transversely of said leaf spring means and of said pivot shaft, a pair of cam means mounted to said sleeve on opposite sides of said leaf spring means, a pair of cam follower arms secured to said pivot shaft and extending transversely therefrom on opposite sides thereof into the path of movement of said respective cam means, to be engaged by said respective cam means, thereby to pivot said pivot shaft back and forth to effect snapping of said leaf spring means, inter-engaging stop means on the respective cam means to prevent such relative adjustment between said cam means as would result in jamming through simultaneous operation of both said cam means on said cam follower arms, and a center shaft extending into said sleeve and splined thereto, the central opening of said sleeve passing completely through said housing means to permit said center shaft to extend completely through said housing means, whereby a plurality of similar switch mechanisms may be stacked together to be operated from a single center shaft, the spline engagement between said center shaft and said sleeve being confined to the center portion of said sleeve, leaving each end of said sleeve free of engagement from said center shaft, thereby to enhance the misalignment tolerance permissible between adjacent mechanisms.

6. Snap acting mechanism comprising: housing means, frame means mounted in said housing means, at least one end of said frame means being mounted for longitudinal expansion and contraction with respect to said housing means, leaf spring means pivotally journalled in said frame means on axes at each end of said leaf spring means and being compressed longitudinally to assume an arched attitude, one of said journal axes comprising a pivot shaft pivotally mounted in said frame means, the corresponding end of said leaf spring means being secured to said shaft, the other end of said leaf spring means being journalled in and free to turn with respect to said frame means, both on an axis substantially paralleling said shaft, and on an axis longitudinal of said leaf spring means, whereby said other end of said leaf spring means is free to twist slightly relative to said shaft, an operating shaft journalled in said housing means transversely of said leaf spring means and of said pivot shaft, a pair of cam means adjustably mounted to said operating shaft on opposite sides of said leaf spring means and each including worm wheel means, a pair of cam follower arms secured to said pivot shaft and extending transversely therefrom on opposite sides thereof into the path of movement of said respective cam means, to be engaged by said respective cam means, thereby to pivot said pivot shaft back and forth to effect snapping of said leaf spring means, and a worm adjustably mounted to said housing means and engageable from the exterior thereof to be selectively engaged with one or the other of said worm wheel means to selectively adjust said cam means.

7. Snap acting mechanism comprising: housing means, frame means mounted in said housing means, at least one end of said frame means being mounted for longitudinal expansion and contraction with respect to said housing means, leaf spring means pivotally journalled in said frame means on axes at each end of said leaf spring means and being compressed longitudinally to assume an arched attitude, one of said journal axes comprising a pivot shaft pivotally mounted in said frame means, the corresponding end of said leaf spring means being secured to said shaft, the other end of said leaf spring means being journalled in and free to turn with respect to said frame means, both on an axis substantially paralleling said shaft, and on an axis longitudinal of said leaf spring means, whereby said other end of said leaf spring means is free to twist slightly relative to said shaft, an operating shaft journalled in said housing means transversely of said leaf spring means and of said pivot shaft, a pair of cam means adjustably mounted to said operating shaft on opposite sides of said leaf spring means and each including worm wheel means, a pair of cam follower arms secured to said pivot shaft and extending transversely therefrom on opposite sides thereof into the path of movement of said respective cam means, to be engaged by said respective cam means, thereby to pivot said pivot shaft back and forth to effect snapping of said leaf spring means, and a worm having a ball thereon universally mounted in a ball socket fixed with respect to said housing, and engageable from the exterior of said housing means to be selectively engaged with either of said cam means or to be disengaged from both to selectively adjust said cam means.

8. Snap acting mechanism comprising: support means, leaf spring means pivotally journalled in said support means on axes at each end of said leaf spring means and being compressed longitudinally to assume an arched attitude, one of said axes comprising a pivot shaft pivotally mounted in said support means, the corresponding end of said leaf spring means being secured to said shaft, the other end of said leaf spring means being journalled and free to turn with respect to said support means, both on an axis substantially paralleling said shaft and on an axis longitudinal of said leaf spring means, whereby said other end of said leaf spring means is free to twist slightly relative to said shaft, means for turning said shaft to cause said leaf spring means to snap from one side of a line joining said axes to the other side thereof, first electric contact means secured to said leaf spring means, and a plurality of spaced abutment contact means mounted to said support means, side by side and in the path of movement of said first contact means to be engaged and bridged by said first contact means whenever said leaf spring means has snapped in the direction of said abutment contact means.

9. Snap acting mechanism comprising: support means, leaf spring means pivotally journalled in said support means on axes at each end of said leaf spring means and being compressed longitudinally to assume an arched attitude, one of said axes comprising a pivot shaft pivotally mounted in said support means, the corresponding end of said leaf spring means being secured to said shaft, the other end of said leaf spring means being journalled on a pivot pin disposed centrally of said leaf spring means and being free to turn with respect to said support means, both on an axis substantially paralleling said shaft and on an axis longitudinal of said leaf spring means, whereby said other end of said leaf spring means is free to twist slightly relative to said shaft, means for turn said shaft to cause said leaf spring means to snap from one side of a line joining said axes to the other side thereof, first electric contact means secured to said leaf spring means, and a plurality of spaced abutment contact means mounted to said support means, side by side and in the path of movement of said first contact means to be engaged and bridged by said first contact means wherever said leaf spring means has snapped in the direction of said abutment contact means.

10. Snap acting mechanism comprising: housing means, frame means mounted in said housing means, at least one end of said frame means being mounted for longitudinal expansion and contraction with respect to said housing means, leaf spring means pivotally journalled in said frame means on axes at each end of said leaf spring means and being compressed longitudinally to assume an arched attitude, one of said journal axes comprising a pivot shaft pivotally mounted in said frame means, the corresponding end of said leaf spring means being secured to said shaft, the other end of said leaf spring means being journalled in and free to turn with respect to said frame means, both on an axis substantially paralleling said shaft, and on an axis longitudinal of said leaf spring means, whereby said other end of said leaf spring means is free to twist slightly relative to said shaft, means for turning said shaft to cause said leaf spring means to snap from one side of a line joining said axes to the other side thereof, first electric contact means secured to said leaf spring means, and a plurality of spaced abutment contact means mounted to said support means, side by side and in the path of movement of said first contact means to be engaged and bridged by said first contact means whenever said leaf spring means has snapped in the direction of said abutment contact means.

11. Snap acting mechanism comprising: housing means, frame means mounted in said housing means, one end of said frame means being substantially fixed with respect to said housing means, the other end being free for longitudinal expansion and contraction with respect to said housing means, leaf spring means pivotally journalled in said frame means on journal axes at each end of said leaf spring means, the journal axes being spaced apart a distance less than the length of the leaf spring means between the journal points, thereby compressing said leaf spring means from end to end and forcing said leaf spring means to assume an arched attitude, one of said journal axes being located at said substantially fixed end of said frame means and comprising a shaft pivotally mounted in said frame means, the corresponding end of said leaf spring means being secured to said shaft, and means for turning said shaft to cause said leaf spring means to snap from one side of an imaginary line adjoining said axes to the other side thereof.

12. Snap acting mechanism comprising: support means, leaf spring means pivotally journalled in said support means on axes at each end of said leaf spring means and being compressed longitudinally to assume an arched attitude, one of said axes comprising a pivot shaft pivotally mounted in said support means, the corresponding end of said leaf spring means being secured to said shaft, the other end of said leaf spring means being journalled and free to turn with respect to said support means, both on an axis substantially paralleling said shaft and on an axis longitudinal of said leaf spring means, whereby said other end of said leaf spring means is free to twist slightly relative to said shaft, a member mounted for reciprocation substantially transversely of said shaft and having a notch therein, an operating arm secured to said shaft and projecting substantially transversely thereof into said notch, reciprocation of said member effecting turning of said shaft to cause said leaf spring means to snap from one side of a line joining said axes to the other side thereof, first electric contact means secured to said leaf spring means, and a plurality of spaced abutment contact means mounted to said support means, side by side and in the path of movement of said first contact means to be engaged and bridged by said first contact means whenever said leaf spring means has snapped in the direction of said abutment contact means.

13. Snap acting mechanism comprising: housing means, frame means mounted in said housing means, at least one end of said frame means being mounted for longitudinal expansion and contraction with respect to said housing means, leaf spring means pivotally journalled in said frame means on axes at each end of said leaf spring means and being compressed longitudinally to assume an arched attitude, one of said journal axes comprising a pivot shaft pivotally mounted in said frame means, the corresponding end of said leaf spring means being secured to said shaft, the other end of said leaf spring means being journalled in and free to turn with respect to said frame means, both on an axis substantially paralleling said shaft, and on an axis longitudinal of said leaf spring means, whereby said other end of said leaf spring means is free to twist slightly relative to said shaft, an operating shaft journalled in said housing means transversely of said leaf spring means and of said pivot shaft, a pair of cam means mounted to said operating shaft on opposite sides of said leaf spring means, a pair of cam follower arms secured to said pivot shaft and extending transversely therefrom on opposite sides thereof into the path of movement of said respective cam means, to be engaged by said respective cam means, thereby to pivot said pivot shaft back and forth to effect snapping of said leaf spring means.

References Cited in the file of this patent

UNITED STATES PATENTS

| 1,890,375 | Garrett | Dec. 6, 1932 |
| 1,985,506 | Kilgour | Dec. 25, 1934 |
| 2,320,117 | Ayers | May 25, 1943 |
| 2,379,545 | Silva et al. | July 3, 1945 |
| 2,395,572 | Meuer et al. | Feb. 26, 1946 |
| 2,424,668 | Riche | July 29, 1947 |
| 2,428,195 | Breeding | Sept. 30, 1947 |
| 2,430,008 | Fernier | Nov. 4, 1947 |
| 2,474,988 | Sargrove | July 5, 1949 |
| 2,551,772 | Thibaudat | May 8, 1951 |
| 2,592,357 | Trainor | Apr. 8, 1952 |
| 2,599,437 | Dickson | June 3, 1952 |
| 2,658,972 | Brown | Nov. 10, 1953 |
| 2,665,354 | Popp | Jan. 5, 1954 |
| 2,671,152 | Cataldo | Mar. 2, 1954 |
| 2,685,007 | Fischer | July 27, 1954 |
| 2,713,623 | Bourdeau | July 19, 1955 |
| 2,743,332 | Torres | Apr. 24, 1956 |
| 2,749,406 | Clapp | June 5, 1956 |

FOREIGN PATENTS

| 14,995/15 | Great Britain | Aug. 10, 1916 |
| 8,229/27 | Australia | May 1, 1928 |
| 743,662 | France | Jan. 16, 1933 |
| 415,084 | Great Britain | Aug. 17, 1934 |
| 253,337 | Switzerland | Nov. 1, 1948 |
| 649,613 | Germany | Aug. 28, 1937 |